United States Patent [19]

Spaggiari

[11] Patent Number: 4,931,681
[45] Date of Patent: Jun. 5, 1990

[54] ONE-PIECE SUPPORT AND END COVER STRUCTURE FOR ELECTRIC MOTORS

[75] Inventor: Terzino Spaggiari, Correggio, Italy

[73] Assignee: SPAL s.r.l., Correggio, Italy

[21] Appl. No.: 349,577

[22] Filed: May 9, 1989

[30] Foreign Application Priority Data

May 17, 1988 [IT] Italy ................... 4832/88[U]

[51] Int. Cl.⁵ .................... H02K 1/18; H02K 21/28
[52] U.S. Cl. ............................ 310/89; 310/43;
310/154; 310/246; 29/596
[58] Field of Search ............... 310/42, 43, 68 R, 89,
310/154, 239, 254, 268, 246; 29/596

[56] References Cited

U.S. PATENT DOCUMENTS

| | | | |
|---|---|---|---|
| 4,342,929 | 8/1982 | Horne | 310/43 |
| 4,593,220 | 6/1986 | Cousins et al. | 310/239 |
| 4,614,886 | 9/1986 | Schneider et al. | 310/239 |
| 4,633,110 | 12/1986 | Genco et al. | 310/68 R |
| 4,663,549 | 5/1987 | Suzuki | 310/89 |
| 4,845,393 | 7/1989 | Huber | 310/43 |

FOREIGN PATENT DOCUMENTS

| | | | |
|---|---|---|---|
| 17524 | 10/1980 | European Pat. Off. | |
| 2282182 | 3/1976 | France | 310/154 |
| 2404328 | 4/1979 | France | |

*Primary Examiner*—Patrick R. Salce
*Assistant Examiner*—D. L. Rebsch
*Attorney, Agent, or Firm*—Fay, Sharpe, Beall, Fagan, Minnich & McKee

[57] ABSTRACT

A combined support and end cover for electric motors, and for small permanent magnet dc units in particular, which is molded in one piece from insulating plastic material and formed essentially as a flat disk of which the inner surface affords a central socket serving to support the corresponding end of the rotor shaft, a set of slotted holders for the brush contacts, and a number of posts projecting perpendicularly from the periphery of the disk between which the permanent magnet pole pieces are supported.

8 Claims, 1 Drawing Sheet

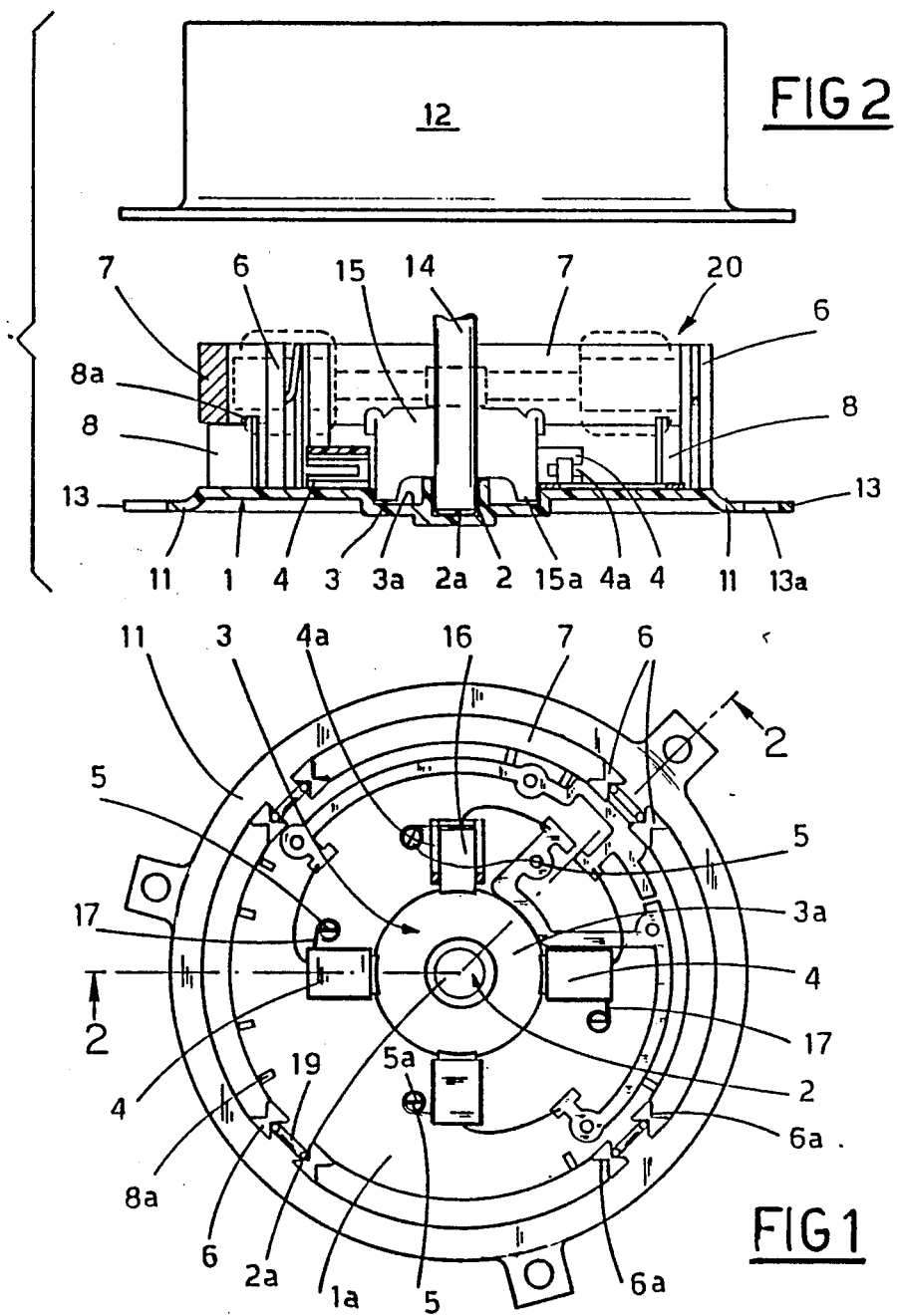

ONE-PIECE SUPPORT AND END COVER STRUCTURE FOR ELECTRIC MOTORS

BACKGROUND OF THE INVENTION

The present invention relates to a combined support and end cover structure for electric motors, and in particular for low power dc motors of the type having pole pieces embodied as permanent magnets. In current methods of manufacturing dc motors, the external and internal structural parts housing and supporting the assembly of stator, rotor, rotor shaft, commutator and brushgear are embodied as a central frame, to the internal surface of which the stator pole pieces and their relative exciting windings are mounted, symmetrically arranged and spaced apart at regular angular distances, and a pair of covers at front and rear, the centers of which incorporate brackets for the rotor shaft bearings.

The bearing bracket of the cover at the commutator side of the motor affords an inward facing collar over which to fit the hub of a spider mounting that provides a rigid support for the stems carrying the brush holders.

In the particular instance of small dc electric motors, there is no bracket on the cover at the commutator side to support a brushgear spider and collar arrangement of the type mentioned; instead, the cover affords a hole to accommodate the end of the rotor shaft and the brushes are mounted direct to the internal face of the cover, radiating from the hole and supported by relative guides generally fashioned in metal, whilst the external surface is fitted with a cap disposed coaxially with the hole accommodating the shaft and containing a journal bearing for the projecting end of the shaft. Likewise in the case of permanent magnet type dc motors, the pole pieces are fitted conventionally to the internal surface of the central fame in the manner mentioned above.

The shaft extension is located at the end of the frame opposite to that occupied by the brushgear, and accordingly, this end is fitted with a second cover, similar to the first and provided with a central bracket to support the shaft.

The main drawback besetting construction methods as outlined above is that of the considerable number of single components which combine to make up the external and internal structure accommodating and supporting the working parts of the electric motor, which in turn renders it impossible to contain the longitudinal dimension of the assembled unit. Excessive length in a small dc motor tends to impose notable limitations on its use, especially with regard to automotive applications in which certain types of unit are required to drive parts located in cramped spaces, for example booster fans and electric windows.

An additional drawback stems from the fact that with a considerable number of single components combining to make up the external and internal structure accommodating and supporting the working parts of the electric motor, assembly operations become relatively lengthy, and the resultant loss of time is reflected in the purchase price of the end-product.

Accordingly, the object of the present invention is to overcome the drawbacks mentioned above.

SUMMARY of the INVENTION

The stated object is realized through the adoption of a combined support and end cover structure for electric motors as disclosed.

The combined structure according to the present invention is intended in particular for permanent magnet dc motors, and consists in a one-piece molding of insulating plastic material embodied substantially as a disk, of which one surface affords a central socket for the support of the corresponding end of the rotor shaft, a plurality of hollow holders for accommodation of the brushes, and a plurality of posts disposed perpendicular to and essentially in a peripheral position on the disk, which serve to support the permanent magnet pole pieces.

One of the advantages afforded by the invention is that of achieving both a marked reduction in the longitudinal dimension of the motor, and notable streamlining of the number of single parts to be assembled.

BRIEF DESCRIPTION of the DRAWINGS

The invention will now be described in detail, by way of example with the aid of the accompanying drawings, in which:

FIG. 1 is a plan of the combined support and end cover according to the invention:

FIG. 2 is the section through II—II in FIG. 1.

DESCRIPTION of the PREFERRED EMBODIMENTS

According to the invention, a combined support and end cover is provided for electric motors, and in particular for small dc motors with permanent magnet type stator pole pieces, that comprises a first element 1 substantially of disk embodiment, fashioned in one piece from insulating plastic material, and, associated with the internal face 1a of the disk, a plurality of hollow holders 4 each accommodating a respective brush contact 16, and a plurality of posts 6 serving to support permanent magnets denoted 7.

Referring to FIG. 2, in which the assembled motor is denoted 20, the first element 1 will be seen to constitute the cover at the end occupied by the commutator 15; it will also be observed that the internal face 1a affords a first socket 2 and an annular second socket 3, positioned concentrically and coaxially with the disk, serving respectively as a bearing in which to support the corresponding end of the shaft 14, and as a seating in which the outermost end 15a of the commutator 15 is freely accommodated.

It will be observed that the bases 2a and 3a of the two sockets 2 and 3 are totally enclosed. The disk 1 is embodied with an integral peripheral annular rim 11 affording a profile designed to register with the edge of an external shell 12 by which the motor 20 is enclosed. 13 denotes at least one fixing lug, extending from the annular rim 11 and affording a hole 13a through which to insert a fastener such as a screw or a rivet, etc. . . The hollow holders 4, each of which is provided with at least one lateral slot 4a, are arranged in a radial pattern around the annular second socket 3 on the internal face 1a of the disk 1 (see FIG. 1), spaced apart at identical angular distance one from the next and separated diametrically by a distance marginally greater than the overall diameter of the commutator 15; each such hollow holder 4 serves to accommodate a relative brush contact 16 of the electric motor 20. Where different constructional requirements prevail, an alternative embodiment of the invention (not illustrated) might feature a different brush geometry, in which the holders 4 are set at an angle along directions tangential to the edge of the socket 3.

5 denotes a pin issuing from the disk alongside each hollow holder 4 and serving as anchor point for a tension spring 17 against which the relative brush contact 16 is loaded.

The posts 6 are arranged in pairs, projecting from the internal face 1a perpendicularly at points equispaced around the periphery, and are fashioned with a longitudinal groove 6a on either side, of which one receives the correspondingly shaped end of a relative pole piece embodied as a permanent magnet 7. More exactly, the two posts 6 of each pair are separated by a distance such as enables the two free inward facing grooves to accommodate a U-shaped spring 19, the purpose of which being to urge the posts 6 apart and thus hold the permanent magnets 7 in position by tension.

The posts 6 will be at least equal in height to the permanent magnets 7, but might be extended in such a way as to provide distance pieces between the poles and the shell 12.

Finally, the disk 1 affords a plurality of radial fins 8 distributed around its periphery, occupying the spaces between successive pairs of posts, each of which exhibits a projection 8a issuing from the side nearest the center of the motor; the profile of the fins thus provides a stop against which each permanent magnet 7 is made to locate.

What is claimed:

1. A combined support and end cover structure for dc motors with a commutator at one end and permanent magnet type stator pole pieces, comprising:
    a first element embodied substantially in the form of a disk and constituting a cover for the end of the electric motor occupied by the commutator, the internal face of which affords a first socket providing a journal bearing for the shaft of the motor;
    a plurality of hollow holders associated with the internal face of the first element near to the first socket, each provided with at least one lateral slot and accommodating a respective brush contact;
    a plurality of pins, issuing one alongside each hollow holder from the internal face of the firs element and serving as anchors for relative tension springs against which the single brush contacts are loaded;
    a plurality of posts serving to support the permanent magnet pole pieces of the motor, projecting perpendicularly from points equally spaced around the periphery of the first element and fashioned with a longitudinal groove on either side;
    a plurality of radial fins each exhibiting a projection at one end, distributed around the periphery of the first element and occupying the spaces between successive posts in such a way as to provide stops against which the permanent magnet pole pieces are positioned.

2. A structure as in claim 1, wherein the first element further comprises an annular second socket that is disposed coaxial with the first socket and freely accommodates the outermost end of the commutator.

3. A structure as in claim 1, comprising a first element the internal face of which affords a first socket providing a journal bearing for the shaft of the motor and an annular second socket coaxial with the first socket and freely accommodating the outermost end of the commutator, wherein the bases of the two sockets are totally enclosed.

4. A structure as in claim 1, wherein the posts are arranged in pairs and positioned at identical angular distance one from the next around the periphery with the two posts of each pair spaced marginally apart.

5. A structure as in claim 1, wherein the height of the single posts is at least equal to that of the permanent magnet pole pieces.

6. A structure as in claim 1, wherein the height of the single posts is greater than that of the permanent magnet pole pieces, in such a way that the posts can also function as distance pieces against which to locate an external shell.

7. A structure as in claim 1, wherein the first element is embodied with an integral peripheral annular rim the profile of which matches that of an external shell, and with at least one lug extending from the annular rim and affording a hole through which to insert a screw, or rivet, or other similar fastener.

8. A structure as in claim 1, fashioned in one piece from rigid insulating plastic material.

* * * * *